(12) United States Patent
Wang et al.

(10) Patent No.: US 12,070,823 B2
(45) Date of Patent: Aug. 27, 2024

(54) HORIZONTAL ASSEMBLY PRESS APPARATUS

(71) Applicant: CINKASA PRECISION INDUSTRIAL CO., LTD., Taichung (TW)

(72) Inventors: Chih-Jung Wang, Taichung (TW); Jhih-Chiang Huang, Taichung (TW); Chao-Tang Huang, Taichung (TW)

(73) Assignee: CINKASA PRECISION INDUSTRIAL CO., LTD., Taichung (TW)

( * ) Notice: Subject to any disclaimer, the term of this patent is extended or adjusted under 35 U.S.C. 154(b) by 336 days.

(21) Appl. No.: 17/702,000

(22) Filed: Mar. 23, 2022

(65) Prior Publication Data

US 2023/0144609 A1    May 11, 2023

(30) Foreign Application Priority Data

Nov. 9, 2021 (TW) ................................. 110141681

(51) Int. Cl.
*B23P 19/02* (2006.01)
*B23P 19/10* (2006.01)
(Continued)

(52) U.S. Cl.
CPC .............. *B23Q 1/626* (2013.01); *B23P 19/02* (2013.01); *B23P 19/10* (2013.01); *B23P 19/105* (2013.01); *B23P 21/002* (2013.01); *B23Q 1/015* (2013.01); *B23Q 3/186* (2013.01); *B23Q 15/14* (2013.01); *B23P 19/04* (2013.01); *Y10T 29/4994* (2015.01)

(58) Field of Classification Search
CPC ......... B23P 19/02; B23P 19/04; B23P 19/105; B23P 21/002; B23Q 3/186; Y10T 29/4994; B23K 3/00
See application file for complete search history.

(56) References Cited

U.S. PATENT DOCUMENTS 4,680,849 A * 7/1987 Diekman ................ B23P 19/02
269/45
4,763,394 A * 8/1988 Decato .................... B23P 19/02
29/252
(Continued)

FOREIGN PATENT DOCUMENTS

DE    19809184 A1 * 10/1998 ............. B21D 43/12

*Primary Examiner* — Jermie E Cozart
(74) *Attorney, Agent, or Firm* — Nixon & Vanderhye PC (57) ABSTRACT

A horizontal assembly press apparatus for performing a press-fit operation of a workpiece assembly along a horizontal axis includes a machine body unit, two moving units, two camera units, two pressing bed units and a processing unit. The machine body unit includes two main machine bodies defining an operating channel therebetween. The moving units are respectively and movably disposed on the main machine bodies. The camera units fetch images of the workpiece assembly entered the operating channel and output image signals. The pressing bed units are operated to press the workpiece assembly. The processing unit receives and analyzes the image signals, determines a target position of the horizontal axis, controls movement of the moving units to bring the pressing bed units to the target position, and controls movement of the pressing bed units to perform the press-fit operation of the workpiece assembly.

8 Claims, 8 Drawing Sheets

(51) Int. Cl.
*B23P 21/00* (2006.01)
*B23Q 1/01* (2006.01)
*B23Q 1/62* (2006.01)
*B23Q 3/18* (2006.01)
*B23Q 15/14* (2006.01)
*B23P 19/04* (2006.01)

(56) References Cited

U.S. PATENT DOCUMENTS

| | | | | | |
|---|---|---|---|---|---|
| 5,537,734 | A | * | 7/1996 | Belka | B23P 19/02 |
| | | | | | 29/709 |
| 5,722,147 | A | * | 3/1998 | Brazle | B23P 19/02 |
| | | | | | 29/525 |
| 5,974,650 | A | * | 11/1999 | Kawabata | B23P 19/04 |
| | | | | | 29/714 |
| 6,128,814 | A | * | 10/2000 | Belka | B23P 19/02 |
| | | | | | 29/466 |

* cited by examiner

HORIZONTAL ASSEMBLY PRESS APPARATUS

CROSS-REFERENCE TO RELATED APPLICATION

This application claims priority of Taiwanese Patent Application No. 110141681, filed on Nov. 9, 2021.

FIELD

The disclosure relates to a machine tool, and more particularly to a horizontal assembly press apparatus.

BACKGROUND

A conventional horizontal assembly press machine is to perform a press-fit operation of a workpiece assembly along a horizontal axis. The workpiece assembly includes a main workpiece and first and second workpieces respectively disposed at two opposite sides of the main workpiece along the horizontal axis. The press machine includes a machine base and two press heads respectively disposed at two opposite sides of the machine base and driven to be moved toward each other along the horizontal axis. An operating space is defined among the machine base and the press heads for placing the workpiece assembly therein. The press heads are respectively placed at outboard sides of the first and second workpieces, and are actuated to move close to each other along the horizontal axis so as to press the first and second workpieces to perform the press-fit operation of the first and second workpieces to the main workpiece.

In operation, the workpiece assembly is placed in the operating space by an operator, and the operator manually adjusts the first workpiece and the second workpiece for them to be respectively registered with the press heads, and installs auxiliary fixtures on the press heads between the first and second workpieces so as to perform the press-fit operation. However, such manner for aligning the first and second workpieces with the press heads through manual adjustment may cause deflection of the first and second workpieces relative to the main workpiece during the press-fit operation, which results in an installation error.

SUMMARY

Therefore, an object of the disclosure is to provide a horizontal assembly press apparatus that can alleviate at least one of the drawbacks of the prior art.

According to the disclosure, the horizontal assembly press apparatus is for performing a press-fit operation of a workpiece assembly along a horizontal axis. The workpiece assembly includes a main workpiece and first and second workpieces respectively disposed at two opposite sides of the main workpiece along the horizontal axis and rotatable about the horizontal axis relative to the main workpiece. The apparatus includes a machine body unit, two moving units, two camera units, two pressing bed units and a processing unit. The machine body unit includes two main machine bodies which are spaced apart from each other in a left-right direction that is parallel to the horizontal axis, and an operating channel which is defined by and between the two main machine bodies and which extends in a front-rear direction that is perpendicular to the left-right direction for movement of the workpiece assembly therein. The moving units are respectively disposed on the two main machine bodies and at left and right sides of the operating channel, and are movable relative to the main machine bodies in an up-down direction and the front-rear direction. The up-down direction is perpendicular to both the left-right direction and the front-rear direction. Each of the camera units is disposed on a respective one of the two moving units to fetch an image of the workpiece assembly entered the operating channel and output an image signal. The pressing bed units are respectively disposed on the moving units and respectively operated to press the first workpiece and the second workpiece along the horizontal axis toward the main workpiece. The processing unit is in signal connection with the camera units, the moving units and the pressing bed units. The processing unit receives and analyzes the image signals from the camera units, determines a target position of the horizontal axis in the image signals, controls movement of the moving units according to the target position to bring the pressing bed units to the target position, and controls movement of the pressing bed units to respectively press the first workpiece and the second workpiece to perform the press-fit operation of the first and second workpieces to the main workpiece along the horizontal axis.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
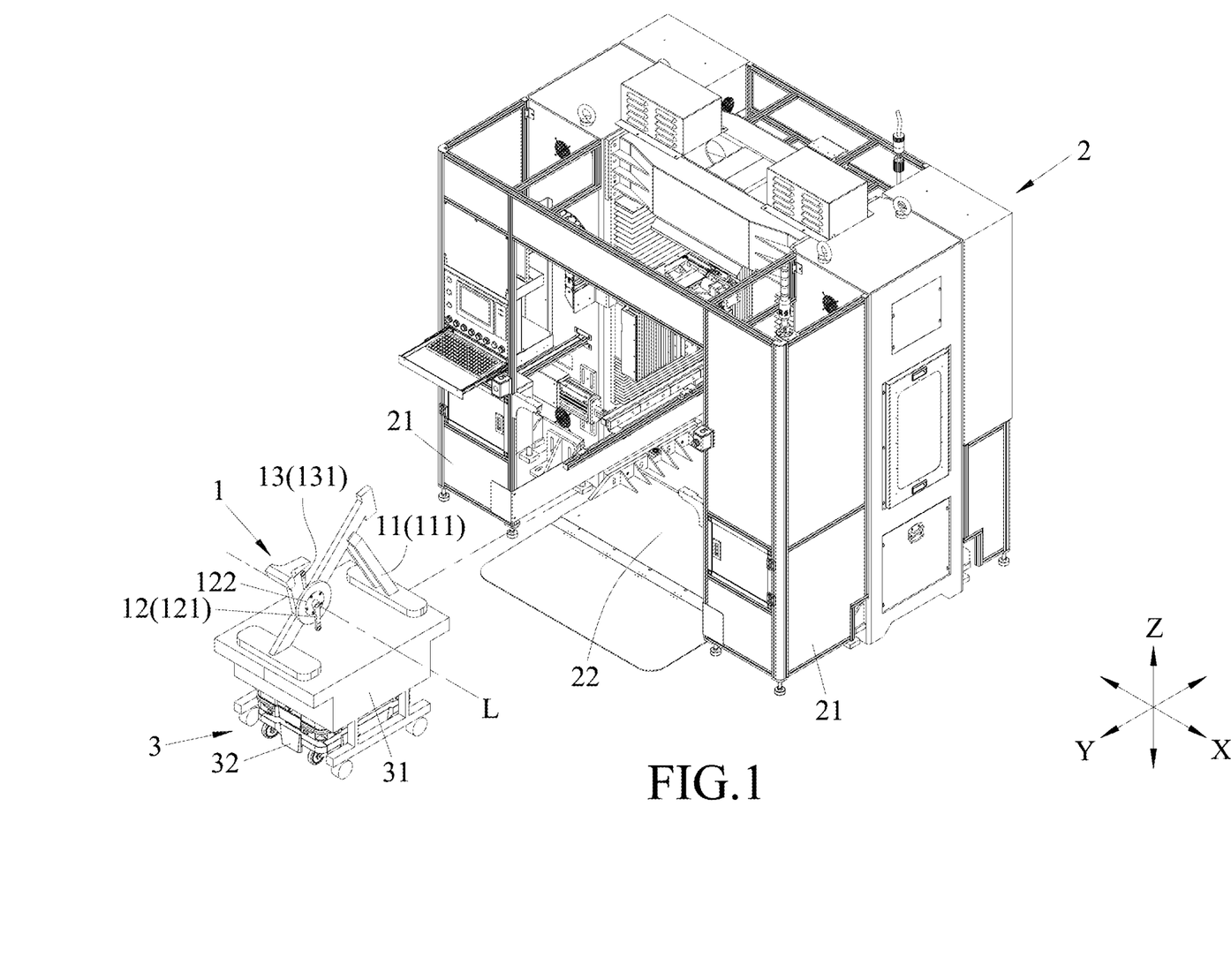
FIG. 1 is a perspective view illustrating an embodiment of a horizontal assembly press apparatus according to the disclosure.
Figure 2:
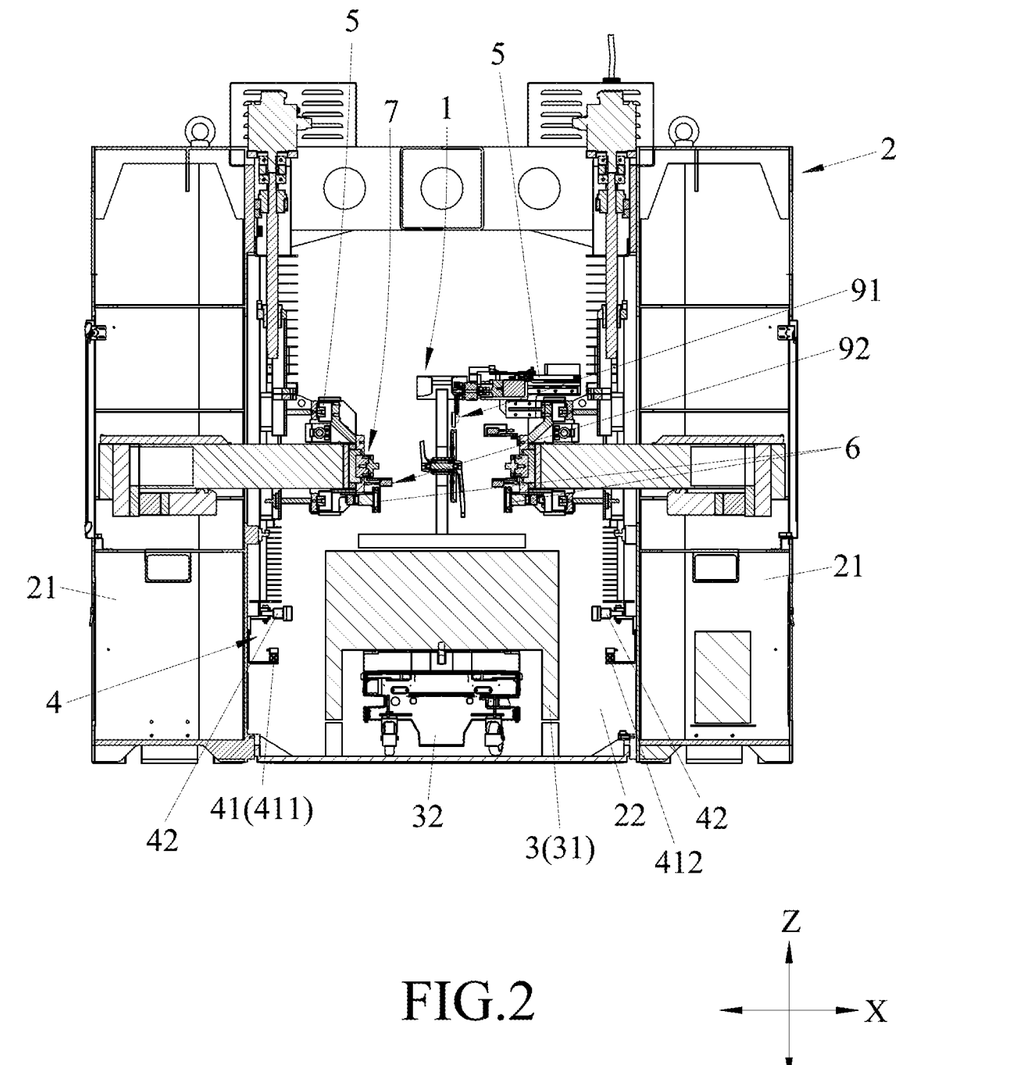
FIG. 2 is a schematic sectional view illustrating the embodiment in a state when a carrying unit reaches a stop point of a predetermined course.
Figure 3:
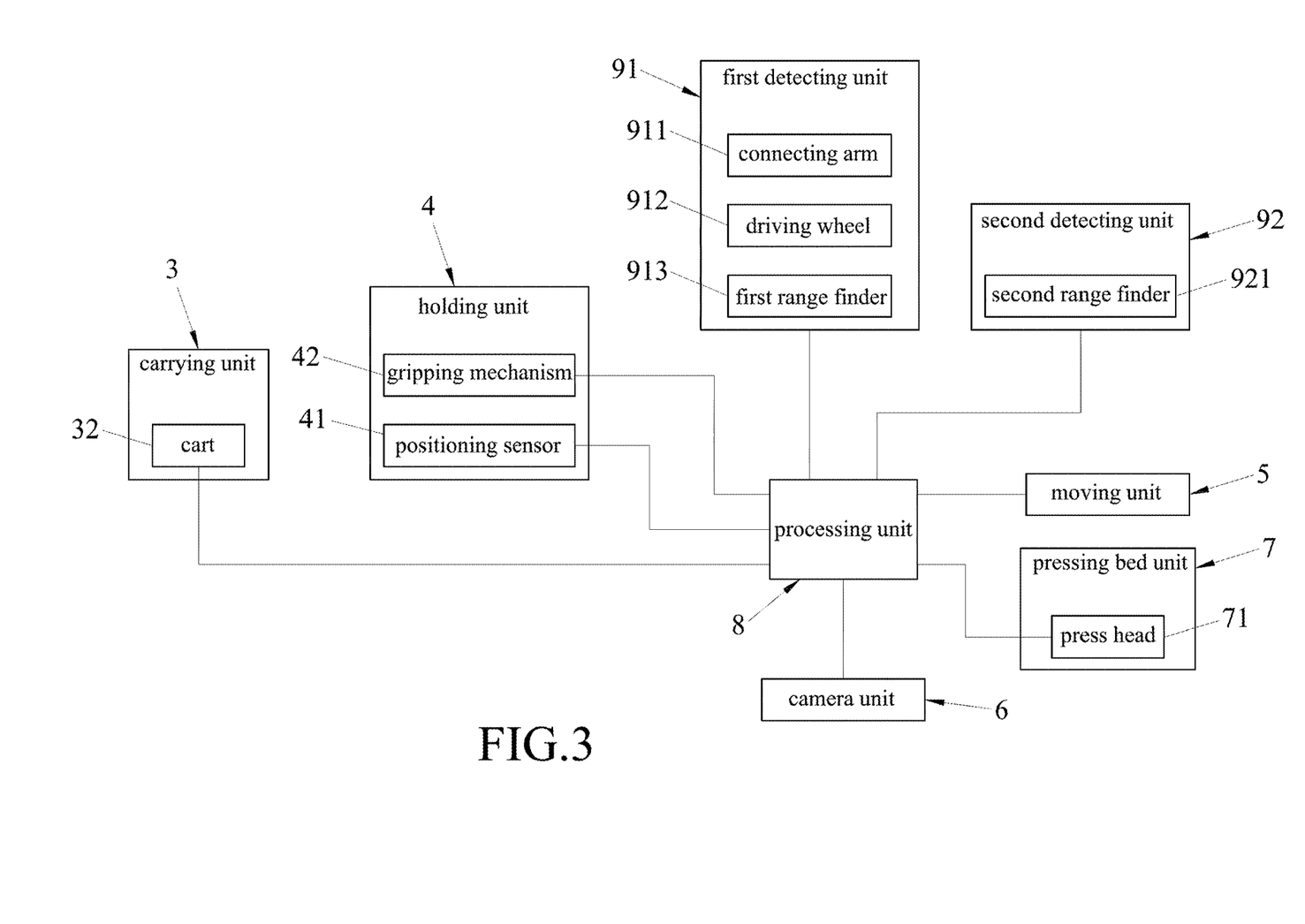
FIG. 3 is a block diagram of the embodiment.

Referring to FIGS. 1 to 3, an embodiment of a horizontal assembly press apparatus according to the disclosure is for performing a press-fit operation of a workpiece assembly 1 along a horizontal axis (L). The workpiece assembly 1 generally includes a main workpiece 11 and first and second workpieces 12, 13 respectively disposed at two opposite sides of the main workpiece 11 along the horizontal axis (L) and rotatable about the horizontal axis (L) relative to the main workpiece 11. The horizontal assembly press apparatus includes a machine body unit 2, a carrying unit 3, a holding unit 4, two moving units 5, two camera units 6, two pressing bed units 7, a processing unit 8, a first detecting unit 91 and two second detecting units 92.

Figure 4:
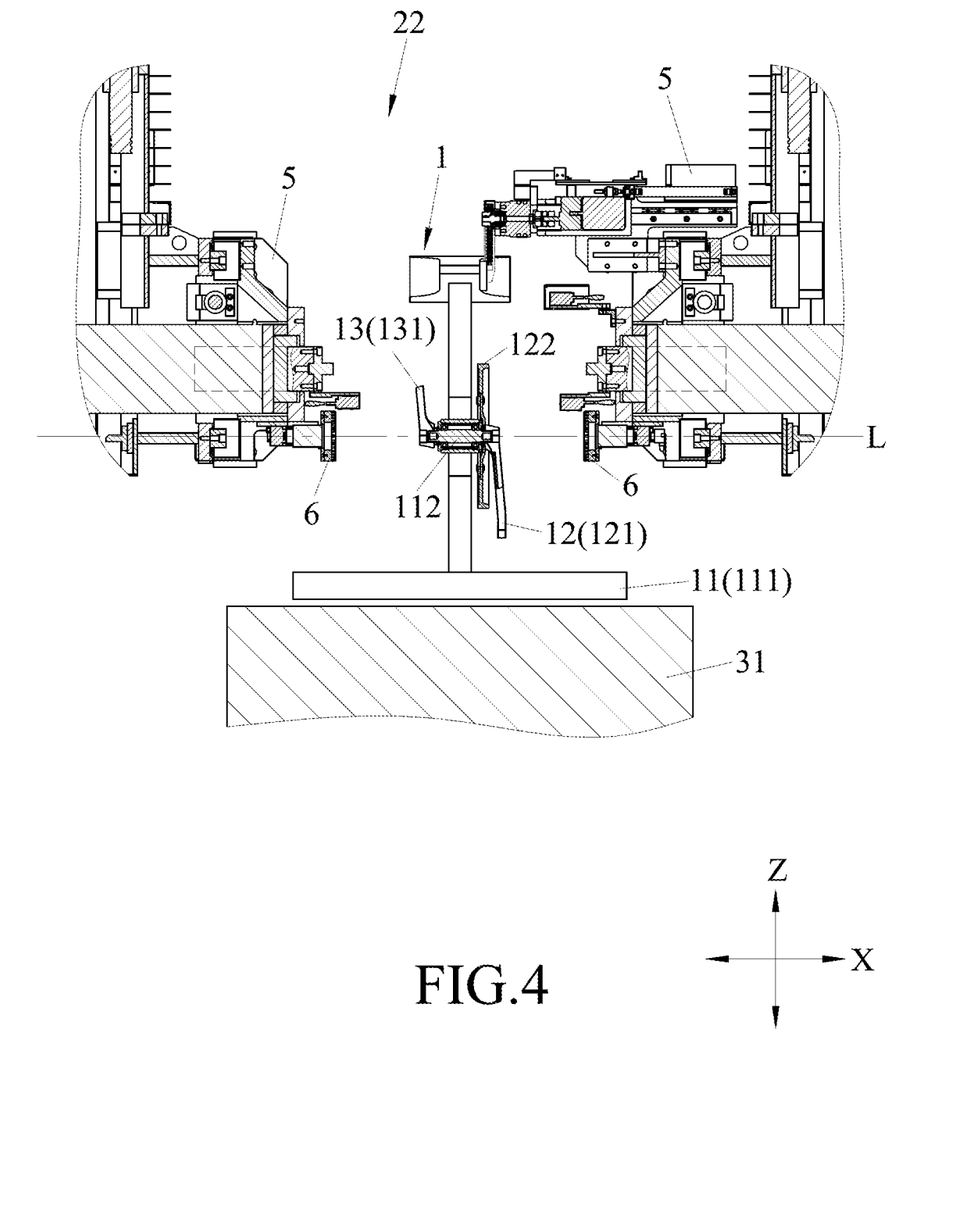
FIG. 4 is a fragmentary sectional view illustrating the embodiment in a state when two camera units are moved with two moving units to a fetching position.

With reference to FIGS. 1 and 4, in this embodiment, the workpiece assembly 1 is a spinning cycle. The main workpiece 11 includes a frame body 111 and a crank shaft 112 disposed on the frame body 111 and extending along the horizontal axis (L). The first workpiece 12 includes a first crank arm 121 to be mounted on an end of the crank shaft 112, and a crank disc 122 disposed on the first crank arm 121. The second workpiece 13 includes a second crank arm 131 to be mounted on an opposite end of the crank shaft 112 along the horizontal axis (L). Before the press-fit operation, the crank shaft 112 has been disposed on the frame body 111, and the first crank arm 121 and the second crank arm 131 are initially disposed on the crank shaft 112 by an operator.

Referring to FIG. 1, the machine body unit 2 includes two main machine bodies 21 which are spaced apart from each other in a left-right direction (X) that is parallel to the horizontal axis (L), and an operating channel 22 which is defined by and between the two main machine bodies 21 and which extends in a front-rear direction (Y) that is perpendicular to the left-right direction for movement of the workpiece assembly 1 therein.

With reference to FIGS. 1 and 3, the carrying unit 3 includes a carrier seat 31 for carrying the workpiece assembly 1 thereon, and a cart 32 which supports the carrier seat 31 thereon and which is in signal connection with the processing unit 8. The cart 32 is remotely controlled to move along a predetermined course in and from the operating channel 22. The predetermined course has a predetermined stop point in the operating channel 22. The cart 32 emits a positioning signal when reaching the stop point.

With reference to FIGS. 2 and 3, the holding unit 4 includes two positioning sensors 41 spaced apart from each other in the front-rear direction (Y) and in signal connection with the processing unit 8, and two gripping mechanisms 42 in signal connection with the processing unit 8 and respectively disposed on the two main machine bodies 21 and at the left and right sides of the operating channel 22, respectively. The positioning sensors 41 are respectively disposed corresponding to front and rear sides of the carrier seat 31 on the stop point so as to detect the front and rear positions of the carrier seat 31. Each of the positioning sensors 41 has an infrared emitter 411 and an infrared receiver 412 respectively disposed on the main machine bodies 21 and at the left and right sides of the operating channel 22. The gripping mechanisms 42 are controlled by the processing unit 8 and are extendable from the main machine bodies 21 in the left-right direction (X) toward each other. The processing unit 8 receives the positioning signal and controls the gripping mechanisms 42 to respectively grip on left and right sides of the carrier seat 31 so as to permit the workpiece assembly 1 on the carrier seat 31 to be steadily subjected to the press-fit operation.

During the press-fit operation of the workpiece assembly 1, the infrared emitters 411 are kept emitting infrared light to be received by the infrared receivers 412. Once one of the infrared receivers 412 does not receive infrared light, it is determined that the carrying unit 3 is moved wrongly and at an improper position. The processing unit 8 thus controls all processing steps to stop them and emits a warning to the operator and a stop signal to the cart 32. The cart 32 carrying the carrier seat 31 and the workpiece assembly 1 is then retracted from the stop point out of the operating channel 22.

The moving units 5 are respectively disposed on the main machine bodies 21 and at left and right sides of the operating channel 22, and in signal connection with the processing unit 8. The moving units 5 are controlled by the processing unit 8 to be movable relative to the main machine bodies 21 in an up-down direction (Z) and the front-rear direction (Y) (see FIG. 1). The up-down direction (Z) is perpendicular to both the left-right direction (X) and the front-rear direction (Y).

With reference to FIGS. 3 and 4, the camera units 6 are respectively disposed on the moving units 5 and in signal connection with the processing unit 8. The processing unit 8 controls the moving units 5 to move the camera units 6 to a predetermined fetching position so as to permit the camera units 6 to fetch an image of the workpiece assembly 1 entered the operating channel 22, and to output an image signal to the processing unit 8. In the fetching position, the camera units 6 are respectively and substantially aligned with the first and second workpieces 12, 13.

Figure 5:
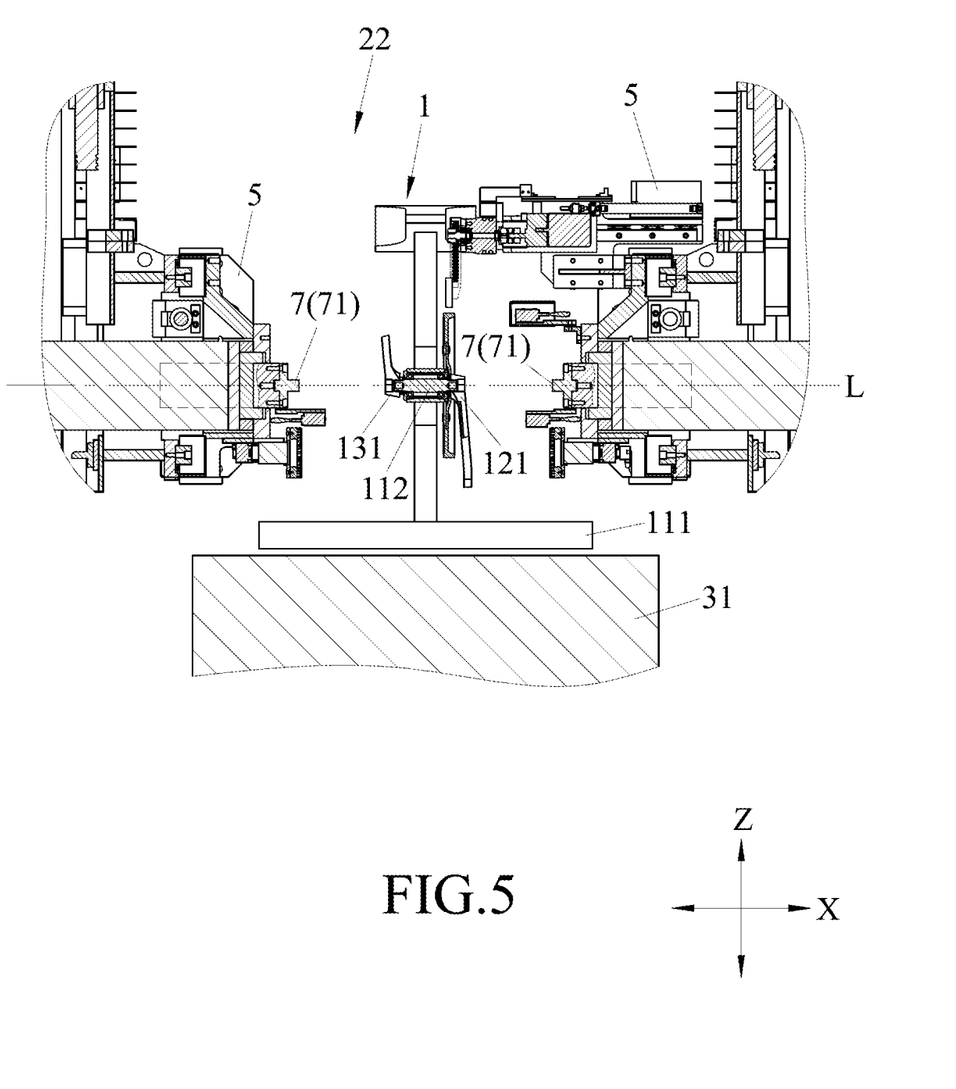
FIG. 5 is a fragmentary sectional view illustrating the embodiment in a state when two pressing bed units are moved with the moving units to a target position.
Figure 6:
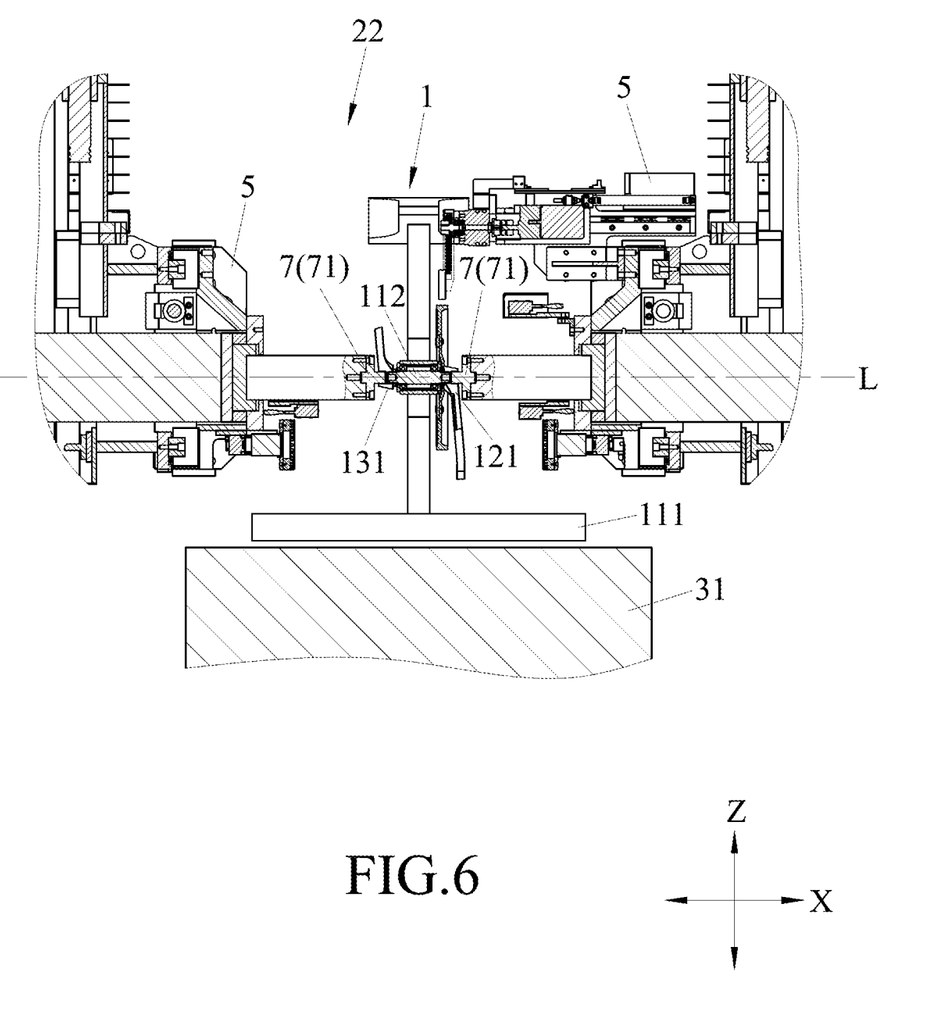
FIG. 6 is a fragmentary sectional view illustrating the embodiment in a state when the pressing bed units perform a press-fit operation of a workpiece assembly.

With reference to FIGS. 3, 5 and 6, the pressing bed units 7 are respectively disposed on the moving units 5 and in signal connection with the processing unit 8. Each pressing bed unit 7 includes a press head 71 which is controlled by the processing unit 8 and extendable toward and retractable from the workpiece assembly 1 in the left-right direction (X).

The processing unit 8 is in signal connection with the cart 32, the holding unit 4, the camera units 6, the moving units 5, the pressing bed units 7, the first detecting unit 91 and the second detecting units 92. The processing unit 8 receives and analyzes the image signals from the camera units 6, determines a target position of the horizontal axis (L) in the image signals, controls the movement of the moving units 5 according to the target position to bring the press heads 71 to the target position, and controls the movement of the press heads 71 to project along the horizontal axis (L) toward the workpiece assembly 1 so as to respectively press the first crank arm 121 and the second crank arm 131 to perform the press-fit operation of the first and second crank arms 121, 131 to the crank shaft 112 along the horizontal axis (L).

Figure 7:
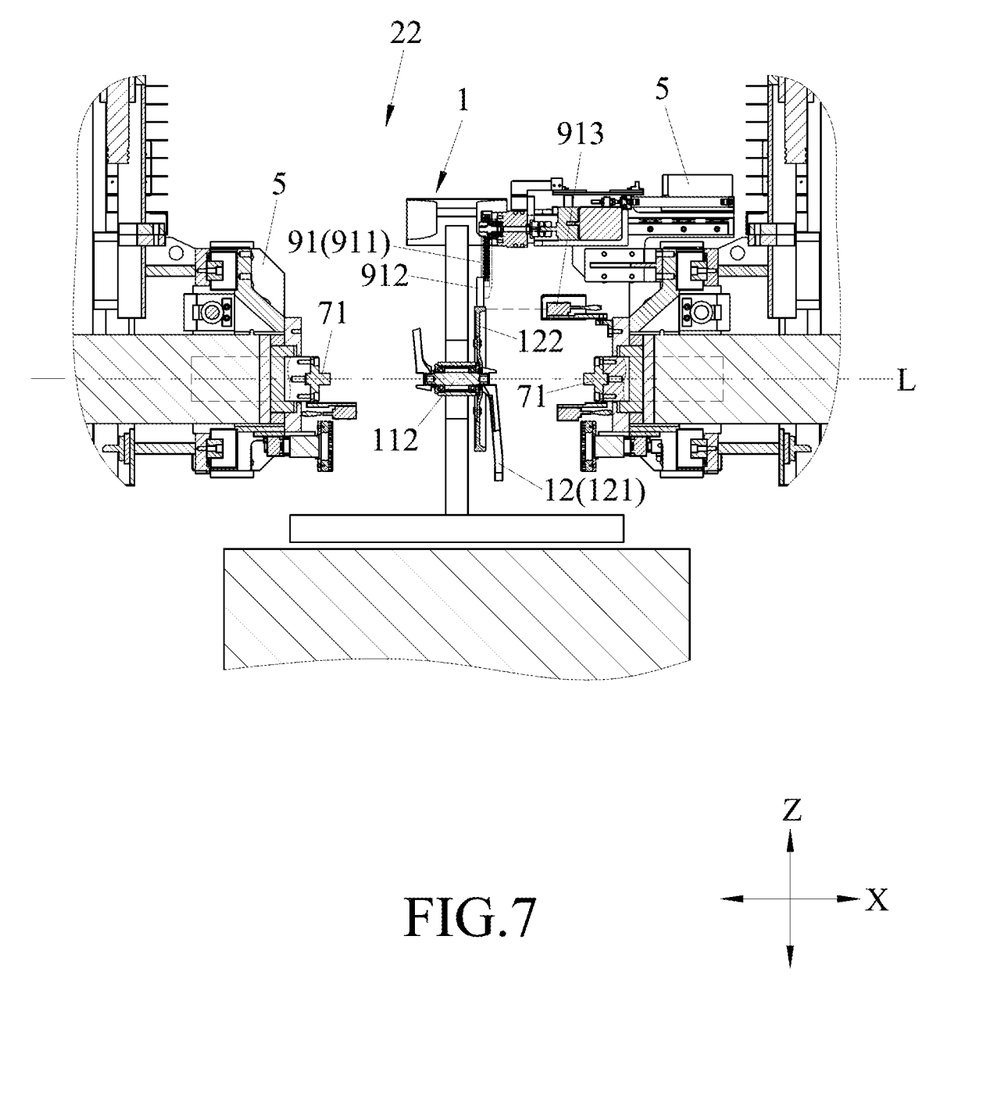
FIG. 7 is a fragmentary sectional view illustrating the embodiment in a state when a first workpiece of the workpiece assembly is rotated by a driving wheel.

With reference to FIGS. 3 and 7, the first detecting unit 91 is disposed on one of the moving units 5 adjacent to the first workpiece 12, and is in signal connection with the processing unit 8. The first detecting unit 91 includes a connecting arm 911 having an end which is pivotally connected with a corresponding one of the moving units 5, a driving wheel 912 disposed to an opposite end of the connecting arm 911, and a first range finder 913 disposed on the corresponding moving unit 5 to correspond to the first workpiece 12. After the moving units 5 are controlled by the processing unit 8 to move the pressing bed units 7 to the target position and perform the press-fit operation, the connecting arm 911 is controlled by the processing unit 8 and swung to bring the driving wheel 912 to abut against the crank disc 122 such that the driving wheel 912 is driven to rotate so as to make a rotation of the crank disc 122 relative to the crank shaft 112. The first range finder 913 is registered with an outer rim of the crank disc 122 and measures a runout of the crank disc 122 during the rotation of the crank disc 122. The processing unit 8 receives the runout and determines whether it exceeds an error threshold which is preset according to the dimension of the workpiece assembly 1. The error threshold is about 0.05 mm in this embodiment. The runout refers to a deflection that occurs when the first crank arm 121 is press-fitted with the crank shaft 112. Specifically, the crank disc 122 is disposed on the first crank arm 121. The deflection of the crank disc 122 might occur when rotated relative to the crank shaft 112. The maximum displacement of this deflection along the direction of the horizontal axis (L) is said runout. The crank disc 122 is made from a metal material, and the driving wheel 912 is made of a material with higher friction, such as Mono Cast (MC) nylon. The driving wheel 912 hence can drive rotation of the crank disc 122.

Figure 8:
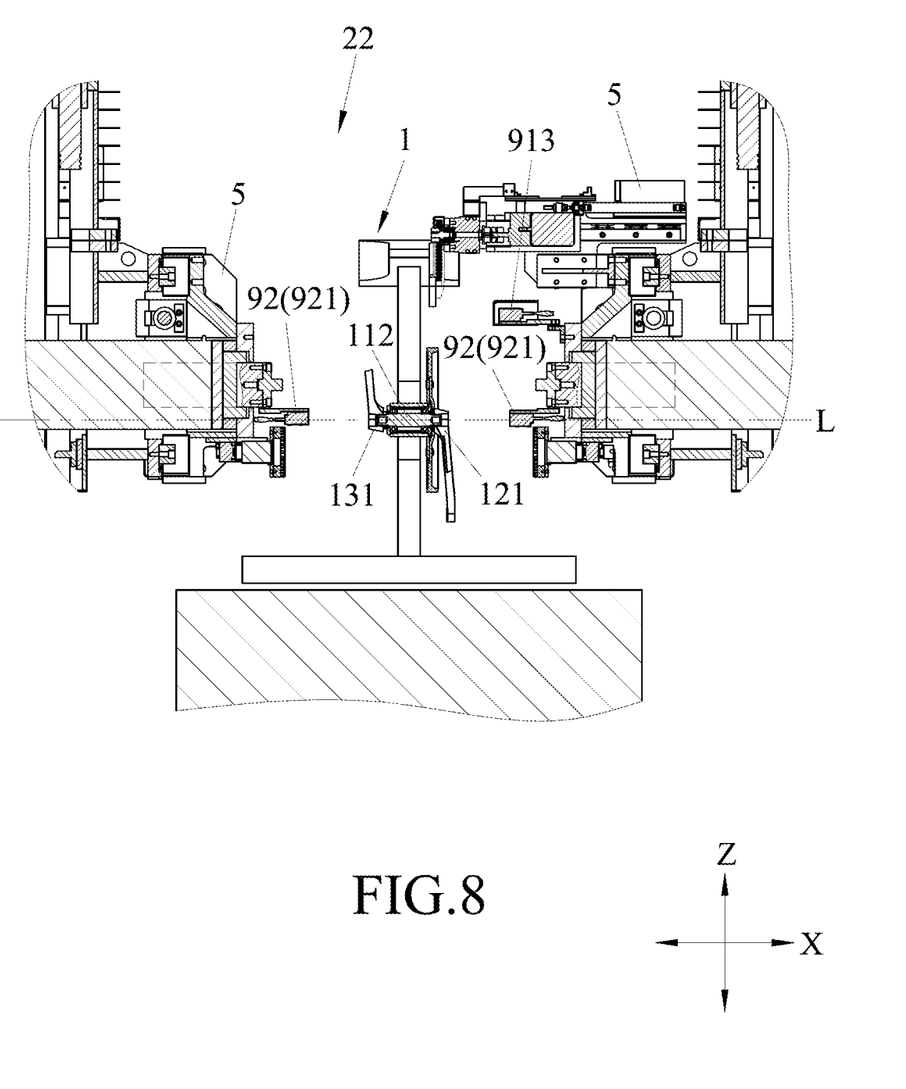
FIG. 8 is a fragmentary sectional view illustrating the embodiment in a state when two second range finders are moved with the moving units to the target position for measuring the workpiece assembly.

With reference to FIGS. 3 and 8, the second detecting units 92 are respectively disposed on the moving units 5 and in signal connection with the processing unit 8. Each second detecting unit 92 includes a second range finder 921. After the press-fit operation of the workpiece assembly 1 is completed, the moving units 5 are controlled and moved by the processing unit 8 to bring the second range finders 921 to the target position. Each of the second range finders 921 measures a distance between it and a corresponding one of the first and second crank arms 121, 131. The processing unit 8 then calculates, according to the distances, values of press-fit depth of the first and second crank arms 121, 131 relative to the crank shaft 112, and determines whether such values fall in a predetermined value range. The value range is preset by an operator according to the dimension of the workpiece assembly 1.

For example, the first range finder 913 and the second range finders 921 are laser range finders.

With reference to FIGS. 1 to 3, in operation, the main workpiece 11 is placed on the carrier seat 31, and the first crank arm 121 with the crank disc 122 and the second crank arm 131 are initially disposed on two opposite ends of the crank shaft 112 along the horizontal axis (L). Subsequently, the cart 32 with the carrier seat 31 and the workpiece assembly 1 carried thereon is moved in the predetermined course to feed the workpiece assembly 1 in the front-rear direction (Y) into the operating channel 22, and is stopped moving in the operating channel 22 when reaching the stop point and emits the positioning signal. The processing unit 8, when receiving the positioning signal, controls the gripping mechanisms 42 to respectively grip on the left and right sides of the carrier seat 31 to hold firmly the carrier seat 31.

Next, with reference to FIGS. 4 to 6, the processing unit 8 controls the moving units 5 to move the camera units 6 to the fetching position, the camera units 6 respectively fetch images of the first workpiece 12 and the second workpiece 13 and output image signals to the processing unit 8. The processing unit 8 receives and analyzes the image signals, and determines a target position of the horizontal axis (L) in the image signals. The processing unit 8 controls the movement of the moving units 5 according to the target position to bring the pressing bed units 7 to the target position, and controls the movement of the press heads 71 to project along the horizontal axis (L) to respectively press the first crank arm 121 and the second crank arm 131 to perform the press-fit operation of the first and second crank arms 121, 131 to the crank shaft 112 along the horizontal axis (L). When the press-fit operation has been completed, the processing unit 8 controls the press heads 71 to be respectively retracted back to the moving units 5 along the horizontal axis (L).

Next, with reference to FIG. 7, the processing unit 8 controls the connecting arm 911 to be swung to bring the driving wheel 912 to abut against the crank disc 122 such that the driving wheel 912 is driven to rotate so as to make a rotation of the crank disc 122 relative to the crank shaft 112. The first range finder 913 measures the runout of the crank disc 122 during the rotation of the crank disc 122. If the processing unit 8 determines that the runout exceeds the error threshold, the processing unit 8 will control all processing steps to stop them and will emit a warning to the operator and emit a stop signal to the cart 32 (see FIG. 2). When the cart 32 receives the stop signal, it and the carrier seat 31 and the workpiece assembly 1 thereon are moved along the predetermined course from the stop point and retracted from the operating channel 22.

With reference to FIG. 8, when the processing unit 8 determines that the runout does not exceed the error threshold, the processing unit 8 controls the moving units 5 to move them so as to bring the second range finders 921 to the target position, and each of the second range finders 921 measures a distance between it and the corresponding one of the first and second crank arms 121, 131. The processing unit 8 then calculates the values of press-fit depth of the first and second crank arms 121, 131 relative to the crank shaft 112. If the processing unit 8 determines that any of the values of press-fit depth does not fall in the predetermined value range, the processing unit 8 will control all processing steps to stop them and will emit a warning to the operator and emit a stop signal to the cart 32 (see FIG. 2). When the cart 32 receives the stop signal, it and the carrier seat 31 and the workpiece assembly 1 thereon are moved along the predetermined course from the stop point and retracted from the operating channel 22. If the processing unit 8 determines that the values of press-fit depth fall in the predetermined value range, an ending signal will be emitted to the cart 32 such that the cart 32 is moved along the predetermined course from the stop point and retracted back from the operating channel 22.

As illustrated, with the camera units 6 respectively fetching images of the first and second workpieces 12, 13 and outputting image signals to the processing unit 8, the processing unit 8 receives and analyzes the image signals, determines a target position of the horizontal axis (L) in the image signals, controls the movement of the moving units 5 according to the target position to bring the press heads 71 to the target position, and controls the movement of the press heads 71 to respectively press the first crank arm 121 and the second crank arm 131 to perform the press-fit operation. Moreover, with the first detecting unit 91 measuring the runout of the crank disc 122 during rotation, with the second detecting units 92 measuring the values of press-fit depth of the first and second crank arms 121, 131 relative to the crank shaft 112, and with the processing unit 8 determining whether the runout exceeds the error threshold, and whether the press-fit depths fall in the predetermined value range, the workpiece assembly 1 can be assembled precisely.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A horizontal assembly press apparatus for performing a press-fit operation of a workpiece assembly along a horizontal axis, the workpiece assembly including a main workpiece and first and second workpieces respectively disposed on opposite sides of the main workpiece along the horizontal axis and rotatable about the horizontal axis relative to the main workpiece, said apparatus comprising:

a machine body unit including two main machine bodies which are spaced apart from each other in a left-right direction that is parallel to the horizontal axis, and an operating channel which is defined by and between said two main machine bodies and which extends in a front-rear direction that is perpendicular to the left-right direction for movement of the workpiece assembly therein, a moving unit disposed on each of said two main machine bodies and at one of left and right sides of said operating channel, and movable relative to said main machine bodies in an up-down direction and the front-rear direction, the up-down direction being perpendicular to both the left-right direction and the front-rear direction;

a camera unit disposed on each of said two moving units to fetch an image of the workpiece assembly entered said operating channel and output an image signal;

a pressing bed unit disposed on each of said moving units and respectively operated to press the first workpiece and the second workpiece along the horizontal axis toward the main workpiece; and a processing unit in signal connection with said camera units, said moving units and said pressing bed units, wherein, said processing unit receives and analyzes the image signals from said camera units, determines a target position of the horizontal axis in the image signals, controls movement of said moving units according to the target position to bring said pressing bed units to the target position, and controls movement of said pressing bed units to respectively press the first workpiece and the second workpiece to perform the press-fit operation of the first and second workpieces to the main workpiece along the horizontal axis.

2. The horizontal assembly press apparatus as claimed in claim 1, further comprising a first detecting unit disposed on one of said moving units adjacent to the first workpiece, and in signal connection with said processing unit, said first detecting unit including a driving wheel and a first range finder which corresponds to the first workpiece, wherein, after said moving units are controlled by said processing unit to move said pressing bed units to the target position and perform the press-fit operation, said driving wheel is controlled by said processing unit to engage with the first workpiece and rotate the first workpiece relative to the main workpiece, and said first range finder measures a runout of the first workpiece during the rotation of the first workpiece.

3. The horizontal assembly press apparatus as claimed in claim 2, wherein said first detecting unit further includes a connecting arm having an end which is pivotally connected with a corresponding one of said moving units, said driving wheel being disposed to an opposite end of said connecting arm, the first workpiece having a crank disc, said connecting arm being controlled by said processing unit and swung to bring said driving wheel to abut against the crank disc so as to make a rotation of the crank disc relative to the main workpiece, said first range finder being registered with an outer rim of the crank disc and measuring the runout of the crank disc during the rotation of the crank disc.

4. The horizontal assembly press apparatus as claimed in claim 3, further comprising a second detecting unit disposed on each of said moving units and in signal connection with said processing unit, each of said second detecting units including a second range finder, wherein, said moving units are controlled and moved by said processing unit to bring said second range finders to the target position, each of said second range finders measures a distance between it and a corresponding one of the first and second workpieces, and said processing unit calculates, according to the distances, values of press-fit depth of the first and second workpieces relative to the main workpiece.

5. The horizontal assembly press apparatus as claimed in claim 4, wherein the workpiece assembly is a spinning cycle, the main workpiece including a frame body and a crank shaft disposed on the frame body, the first workpiece further including a first crank arm to be mounted on an end of the crank shaft and having the crank disc disposed thereon, said second workpiece including a second crank arm to be mounted on an opposite end of the crank shaft along the horizontal axis, each of said second range finders being disposed to measure a distance between it and a corresponding one of the first and second crank arms, and said processing unit calculating the values of press-fit depth of the first and second crank arms relative to the crank shaft.

6. The horizontal assembly pressing apparatus as claimed in claim 1, further comprising a carrying unit and a holding unit, said carrying unit being for carrying the workpiece assembly, said carrying unit being operated to feed the workpiece assembly in the front-rear direction into said operating channel, to be stopped in said operating channel, and to emit a positioning signal, said holding unit including two gripping mechanisms in signal connection with said processing unit and a gripping mechanism of said two gripping mechanisms is disposed on each of said two main machine bodies and at one of said left and right sides of said operating channel, said gripping mechanisms being controlled by said processing unit and extendable from said main machine bodies in the left-right direction toward each other, said processing unit receiving the positioning signal and controlling said gripping mechanisms to respectively grip on left and right sides of said carrying unit.

7. The horizontal assembly pressing apparatus as claimed in claim 6, wherein said carrying unit includes a carrier seat for carrying the workpiece assembly thereon, and a cart which supports said carrier seat thereon and which is remotely controlled to move along a predetermined course in and from said operating channel, the predetermined course having a predetermined stop point in said operating channel such that said cart emits the positioning signal when reaching the stop point.

8. The horizontal assembly pressing apparatus as claimed in claim 1, wherein each of said pressing bed units includes a press head which is controlled by said processing unit and extendable toward and retractable from the workpiece assembly in the left-right direction, said press heads being disposed to respectively press the first workpiece and the second workpiece toward each other to perform the press-fit operation of the first and second workpieces to the main workpiece along the horizontal axis.

* * * * *